(12) United States Patent
Takeshita et al.

(10) Patent No.: US 7,258,893 B2
(45) Date of Patent: Aug. 21, 2007

(54) METHOD OF FABRICATING A MAGNETIC RECORDING MEDIUM

(75) Inventors: Hiroto Takeshita, Kawasaki (JP); Takuya Uzumaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/704,362

(22) Filed: Nov. 7, 2003

(65) Prior Publication Data

US 2004/0131891 A1 Jul. 8, 2004

Related U.S. Application Data

(63) Continuation of application No. PCT/JP01/03843, filed on May 8, 2001.

(51) Int. Cl.
  *B05D 5/00* (2006.01)
  *B05D 3/02* (2006.01)

(52) U.S. Cl. .................. 427/131; 427/132; 427/385.5; 427/404; 427/407.1

(58) Field of Classification Search ............... 427/130, 427/131, 132, 299, 385.5, 404, 407.1
See application file for complete search history.

(56) References Cited

U.S. PATENT DOCUMENTS

| | | | |
|---|---|---|---|
| 4,769,281 A | 9/1988 | Shii et al. | 428/336 |
| 4,985,273 A | 1/1991 | Mino | 427/35 |
| 5,277,980 A | 1/1994 | Mino | 428/403 |
| 5,552,236 A * | 9/1996 | Ohtake et al. | 428/826 |
| 5,859,736 A * | 1/1999 | Nagumo | 360/13 |
| 5,909,337 A * | 6/1999 | Tyndall, III | 360/97.01 |

FOREIGN PATENT DOCUMENTS

| | | |
|---|---|---|
| EP | 0 243 798 A2 | 4/1987 |
| EP | 346 074 | 12/1989 |
| EP | 0 491 306 A1 | 12/1991 |
| EP | 0 498 338 A1 | 2/1992 |
| EP | 0 561 279 A1 | 3/1993 |
| EP | 555 906 | 8/1993 |
| JP | 62-243123 | 10/1987 |
| JP | 01-249136 | 10/1989 |
| JP | 02-225534 | 1/1990 |
| JP | 04-143910 | 5/1992 |
| JP | 05-228845 | 9/1993 |
| JP | 05-258293 | 10/1993 |
| JP | 06-045142 | 2/1994 |

* cited by examiner

*Primary Examiner*—Kirsten Jolley
(74) *Attorney, Agent, or Firm*—Greer, Burns & Crain, Ltd.

(57) ABSTRACT

A method of fabricating a magnetic recording medium is disclosed, including a monomolecular film formation step of forming a monomolecular film on a substrate and a magnetic film formation step of forming on the monomolecular film a magnetic film for recording magnetic information. In the monomolecular film formation step, it is preferable to form a perylene-based organic monomolecular film.

7 Claims, 4 Drawing Sheets perylene

PTCDA

DM-PBDCI

FIG.3

| MEDIUM | O/W (dB) | REPRODUCED SIGNAL INTENSITY (μVp-p) | MEDIUM NOISE (μVrms) | MEDIUM S/N (dB) |
|---|---|---|---|---|
| EMBODIED EXAMPLE | −33.5 | 640 | 31.7 | 17.1 |
| PRIOR EXAMPLE | −32.1 | 590 | 43.2 | 13.7 |

METHOD OF FABRICATING A MAGNETIC RECORDING MEDIUM

CROSS-REFERENCES TO RELATED APPLICATIONS

This application is a continuation application of International Application No. PCT/JP01/03843 filed May 8, 2001.

BACKGROUND OF THE INVENTION

1. Field of the Invention

The present invention relates to a magnetic recording medium mounted on a magnetic recording and reproducing apparatus such as a hard disk drive, etc., and in particular, relates to a method of fabricating a magnetic recording medium capable of recording magnetic information with a high recording density and further reproducing the information with low noise.

2. Description of the Related Art

Increasing the capacity of a hard disk drive (HDD) that plays a central role in a magnetic recording and reproducing apparatus is needed with the advancement of the information society. Particularly, the recording density of the HDD is improving at breakneck speed such as an annual rate at or over 100%. In order to realize a high recording density, first, it is necessary to increase the recording density of the magnetic recording medium itself mounted in the HDD, although an improvement such as heightening of the sensitivity of the magnetic head is also needed.

Accordingly, further reducing noise of the magnetic recording medium is required in order to ensure a required S/N. Thus, in regard to a magnetic film being a data-recording layer of the magnetic recording medium, the main technical problems are to refine crystal grains of the magnetic film for recording data according to the miniaturization of bit cells and to isolate the crystal grains magnetically so that magnetic coupling between the crystal grains is reduced as much as possible.

Conventionally, against the problems, studies for coping with the problems such as the improvement of the composition of the magnetic film or adjusting sputter conditions have been performed.

However, a structure such that noise is reduced more certainly is needed in a magnetic film of a magnetic recording medium that enables to realize recording at high density over 100 GB/in From that point of view, as the ideal conditions for a magnetic recording medium are listed, it is necessary to satisfy the following 4 conditions:

that is, (a) The sizes of the crystal grains are approximately 2 through 3 nm, and small;

(b) The dispersion in the sizes of the crystal grains is small;

(c) Furthermore, the filling factor of the crystal grains is fully high; and (d) Then, each crystal grain isolates fully magnetically; including solving the aforementioned problems.

The adjustment of the composition of the magnetic film or the adjustment of the sputter conditions, which is an aforementioned conventional technique, is one of the effective methods in the techniques for facilitating the refinement or magnetic isolation of the crystal grains of the magnetic film.

However, in these methods, it is particularly difficult to suppress the product on of the dispersion in the sizes of the crystal grains so as to form crystal grains having a uniform diameter, and it is difficult to form a magnetic film that satisfies all of the 4 conditions.

SUMMARY OF THE INVENTION

Accordingly, the main object of the present invention is to provide a method of fabricating a magnetic recording medium having a magnetic film, in which the sizes of the crystal grains are fully small and uniform, the filling density thereof is high, and further each crystal grain is fully magnetically isolated.

The above object is achieved by a method of fabricating a magnetic recording medium, including at least a monomolecular film formation step of forming a monomolecular film on a substrate, and a magnetic film formation step of forming on the monomolecular film a magnetic film for recording magnetic information.

Herein, since the monomolecular film has the structure of molecules of which the shapes are singular and the sizes are fine and a magnetic film formed thereon is formed so that the monomolecular film is a nucleation site, and the crystal grain diameters, the grain diameter distribution, and the filling factor are improved. Consequently, if the isolation degree of the crystals is controlled together by performing the composition adjustment or an annealing treatment when the magnetic film is formed, a magnetic recording medium that satisfies all of the aforementioned conditions required for the magnetic recording medium can be fabricated.

Then, the monomolecular film formation step can be an organic monomolecular film formation step of forming an organic monomolecular film on the substrate, and particularly, it is preferable to employ a perylene-based organic monomolecular film having 2-dimensional microfine molecular structures.

Also, from the viewpoint of forming the organic monomolecular film at a good state, a seed film formation step of controlling the crystalline state of the organic monomolecular film may be included before the organic monomolecular film formation step. In the seed film formation step, it is preferable to form at least one of Ag and Au on the substrate.

Also, from the viewpoint of utilizing the crystal structure of the organic monomolecular film as the nucleation site with certainty, a heat-resisting intermediate film formation step of forming a heat-resisting intermediate film having heat resistance, which is adsorbed on the organic monomolecular film, may be further included after the organic monomolecular film formation step. In the heat-resisting intermediate film formation step, it is preferable to form at least one of Ge and Si on the organic monomolecular film.

The heat-resisting intermediate film formed on the organic monomolecular film is a crystal control film for a film formed thereon, since it has such a structure on which the crystal structure of the organic monomolecular film is reflected, which has a structure such that the crystal structure of the organic monomolecular film that is weak against heat can be utilized with certainty as the nucleation site when the magnetic film is formed since the heat resistance is excellent.

Additionally, after the heat-resisting intermediate film is formed, there is no problem even if the crystal structure of the organic monomolecular film is broken or the organic monomolecular film is evaporated so as to disappear.

Also, after the heat-resisting intermediate film formation step, a heat treatment step of performing heat treatment may be further included. The isolation of the crystal grains of the magnetic film can be facilitated by the heat treatment.

Furthermore, the organic monomolecular film may be evaporated by the heat treatment and, in this case, the heat treatment is carried out at or above the temperature at which the organic monomolecular film is evaporated.

Then, the scope of the present Invention includes a magnetic recording and reproducing apparatus in which a magnetic recording medium fabricated by the method of fabricating a magnetic recording medium is mounted. Such a magnetic recording and reproducing apparatus can be provided as an apparatus capable of recording and reproducing high-capacity magnetic information.

BRIEF DESCRIPTION OF THE DRAWINGS

Other objects, features and advantages of the present invention will become more apparent from the following detailed description when read in conjunction with the accompanying drawings, in which:

FIG. 3 is a diagram that collectively shows the results of studied recording and reproducing properties in regard to a magnetic recording medium according to the embodied example and a magnetic recording medium in the prior example;

DETAILED DESCRIPTION OF THE PREFERRED EMBODIMENTS

The preferred embodiment of a magnetic recording medium according to the present invention is described below.

In the present invention, a monomolecular film having a regular microfine structure, preferably an organic monomolecular film, is formed on a substrate and it is an underlying film. The underlying film is used as a template (a nucleation site) and a magnetic film is formed based on the underlying film, so that the crystal grain diameter, the grain diameter distribution, and the filling factor are improved. Furthermore, when the magnetic film is formed, the isolation degree of the crystals is facilitated by adjusting the composition and by heat treatment (annealing), so that a magnetic recording medium with a preferred magnetic film is fabricated.

In the present invention, an organic monomolecular film can be employed as a monomolecular film that is used as the underlying film and, particularly, it is desirable to employ a perylene-based organic monomclecular film.

Figure 1A:
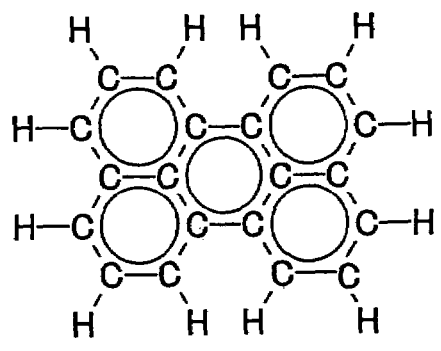
FIG. 1A is a diagram showing the structure of perylene.
Figure 1B:
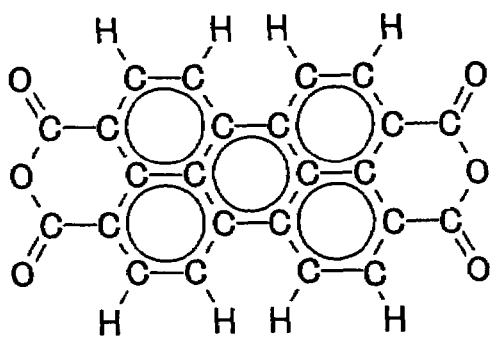
FIG. 1B is a diagram showing the structure of a perylene-based compound PTCDA.
Figure 1C:
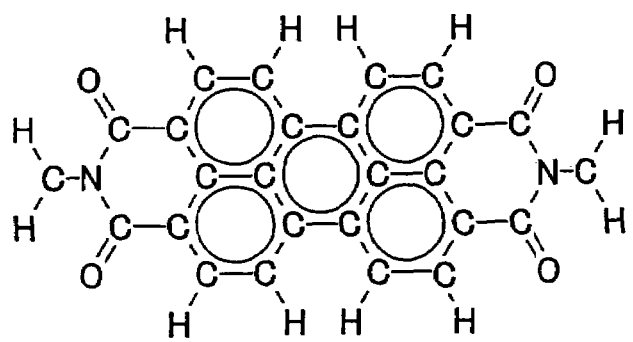
FIG. 1C is a diagram showing the structure of a perylene-based compound DM-PBDCI.

Perylene, as shown in FIG. 1A, is an organic molecule that is composed of five 6-membered rings and has a structure such that termination is provided by hydrogen. Perylene can have a variety of molecular structures dependent on the structures at the terminal portions. As a perylene-based compound, for example, perylene-3,4,9,10-tetracarboxylic-3,4,9,10-dianhydride (hereinafter, PTCDA) shown in FIG. 1B and N,N'-dimethylperylene-3,4,9,10-bis(dicarboximide) (hereinafter, DM-PBDCI) shown in FIG. 1C can be listed.

The perylene-based compounds, of which the molecular size is fine as being equal to or less than 2 nm, have an array structure in which the filling factor of the molecules is high. The monomolecular films of the perylene-based compounds have such a property that the molecules mutually form a regular 2-dimensional lattice. Thus, the perylene-based compound has a regular and high filling-factor planar structure so as to function preferably as the underlying film. Each of the molecules of the perylene-based compound is provided as the structure of molecules of which the shape and size are singular.

Accordingly, if the molecules of the perylene compound are used as nucleation sites and a crystal of the magnetic film is grown based on them, the crystal structure becomes a regularly arrayed uniform and high-density structure, in which the sizes of the crystal grains are unified.

Also, when a desired intermediate film intervenes between the monomolecular film of the perylene-based compound and the magnetic film, if the intermediate film has a structure on which the crystal structure of the organic monomolecular film is reflected and has a crystal control function for a film formed thereon, a preferred magnetic film can be similarly obtained. That is, a preferred magnetic film can be obtained similarly by a method of forming first the intermediate film while the perylene-based compound is the nucleation site and forming the magnetic film on the intermediate film. From the viewpoint of suppressing magnetic influence on the magnetic film, the intermediate film is preferably non-magnetic.

Then, the perylene compound can be epitaxially grown at a preferred condition on the surface of a metal thin film formed from, for example, Ag or Au or alloys thereof. Accordingly, if the metal thin film due to Ag, etc., is used as a seed film of the organic monomolecular film, an organic monomolecular film having a uniform and dense molecular structure can be widely formed By the way, the perylene-based organic monomolecular film formed as described above has a relatively high volatility and evaporates at approximately 200° C. In a fabrication process for a magnetic recording medium, a heating step is generally included.

Accordingly, as a preferred embodiment of the present invention, in order to make a structure such that the crystal structure of the perylene-based monomolecular film can be certainly utilized as the nucleation site, it is recommended that a step of forming a heat-resisting intermediate film with heat resistance on the perylene-based monomolecular film be included. As such a heat-resisting intermediate film, preferable is one having a relatively high melting point and a structure strong against heat and having a property of adsorbing organic molecules selectively. Then, since the heat-resisting intermediate film is disposed between the perylene-based monomolecular film and the magnetic film, a material is selected so that the film also functions as the aforementioned intermediate film that effects the crystal control function.

As a material capable of forming the heat-resisting intermediate film as described above, for example, Ge or Si or alloys thereof can be employed. The heat-resisting intermediate film formed from Ge, etc., has a structure on which the crystal structure of the perylene-based monomolecular film is reflected, by being adsorbed by the perylene-based monomolecular film, and is thermally stable. Thus, a structure can be made which forms the magnetic film while the crystal structure of the perylene-based monomolecular film is the nucleation site, by making a structure such that the heat-resisting intermediate film is intervening.

That is, a film that is formed from Ge, etc., formed on the perylene-based monomolecular film is a thermally stable heat-resisting film and it has a crystal structure on which the perylene-based monomolecular film as the nucleation site is reflected. The magnetic film further formed thereon, in which the sizes of crystal grains are unified, has a regularly arrayed uniform and high-density structure.

By the way, after the heat-resisting intermediate film or the magnetic film is formed while the perylene-based monomolecular film is the nucleation site, the perylene-based monomolecular film is not a necessary component in the magnetic recording medium. The perylene-based monomolecular film may be evaporated by raising the temperature for the annealing treatment. In this case, heat treatment is performed at a temperature such that the perlyelne-based monomolecular film is evaporated.

In order to evaporate the perylene-based monomolecular film, the annealing treatment is performed, for example, at 200 through 350° C. for 0.5 through 10 minutes. After the perylene-based monomolecular film is evaporated, the heat-resisting intermediate film maintains an array structure that is formed while perylene molecules are nuclei.

By performing the annealing treatment, for example, the segregation to a grain boundary of the magnetic film formed from a Cr-based material can be facilitated so as to improve the isolation degree of the crystal grains.

Additionally, in the case of fabricating a magnetic recording medium without performing heat treatment over 200° C., the heat-resisting intermediate film may be omitted so as to form a magnetic film directly while the perylene-based monomolecular film is the nucleation site.

As described above, according to the present invention, since the monomolecular film having a regular and microfine structure functions as the magnetic film or the nucleation site for the crystal grains of the intermediate film, the crystal grain diameter, the grain diameter distribution, and the filling factor can be improved. Furthermore, a magnetic recording medium of which the recording density is heightened can be fabricated by controlling the isolation degree of the crystal grains.

Embodied Example

Moreover, an embodied example according to the present invention is described below by comparison with a prior example. The general structure of one example magnetic recording medium fabricated in accordance with the embodied example is shown in FIG. 2.

Figure 2:
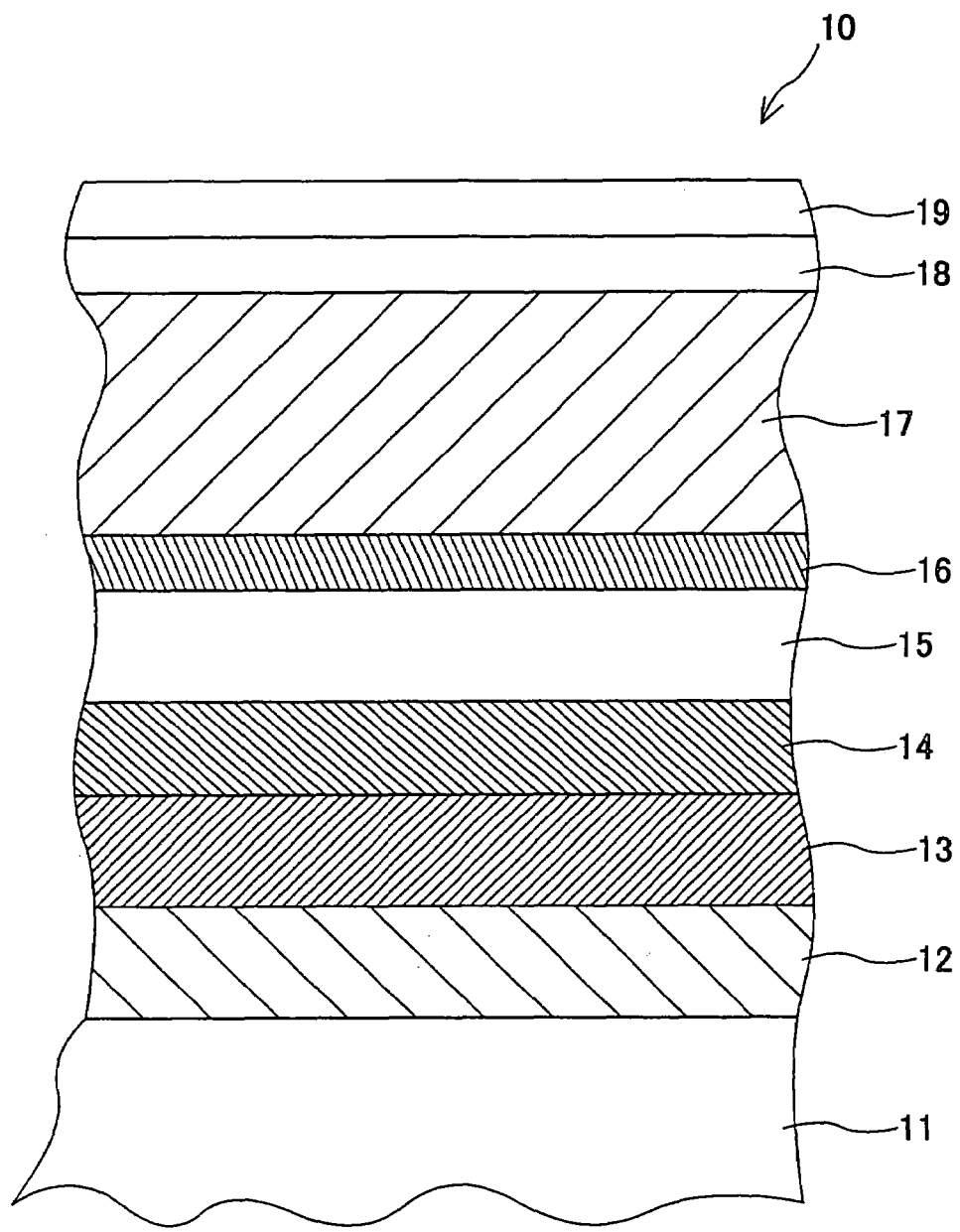
FIG. 2 is a diagram showing the structure of a magnetic recording medium fabricated according to the embodied example.

The fabrication processes for the magnetic recording medium 10 are described in sequence by referring to FIG. 2.

A glass disk (2.5 inches) was employed as a substrate 11. Otherwise, an organic material such as polycarbonate, etc., may be employed.

A metal thin film of Ag with a thickness of 10 nm as a 1st underlying film 12 was deposited on the substrate 11 by a vapor deposition method. The 1st underlying film 12 corresponds to the aforementioned seed film for organic monomolecular film. That is, as a preferred example, it is provided so that a 2nd underlying film 13 deposited thereon is epitaxially grown so as to be an organic monomolecular film having uniform and microfine molecular structures.

Then, PTCDA is deposited as the 2nd underlying film 13 by a vapor deposition method. The 2nd underlying film 13 is the organic monomolecular film being a nucleation site.

As described above, the 2nd underlying film 13 has structures of molecules of which the shapes are singular and the sizes are microfine.

Furthermore, Ge is deposited by 1 nm on the 2nd underlying film 13 by a vapor deposition method so as to be a 1st non-magnetic intermediate film 14. The 1st non-magnetic intermediate film 14 corresponds to the aforementioned heat-resisting intermediate film and a film with heat resistance and functions as a crystal control film for a magnetic layer formed thereon.

After the 1st underlying film 12 of Ag through the 1st non-magnetic intermediate film 14 of Ge were deposited on the substrate 11, as described above, it was introduced into a DC magnetron sputter apparatus and annealing treatment of 250° C.×1 min. was performed.

The annealing treatment is a treatment of heating the side of substrate 11 in order to improve the crystal orientations of the films formed afterward. Although heating is not provided until the PTCDA film (the 2nd underlying film 13) evaporates in the embodied example, temperature may be further raised so as to evaporate the PTCDA film at this moment.

All subsequent deposition treatments were performed by DC magnetron sputtering. The sputter conditions are separately described below.

Cr was further deposited by 5 nm as a 2nd non-magnetic intermediate film 15 on the 1st non-magnetic intermediate film 14. The film is not an essential one, but is provided as a preferred embodiment from the viewpoint of further improving the crystallizability of a magnetic film formed thereon.

Obviously, the 2nd non-magnetic intermediate film of Cr also has a crystal structure similar to these of the 1st non-magnetic intermediate film 14 and is a crystal control film for the magnetic layer.

A magnetic film for recording magnetic information is deposited on the 2nd non-magnetic intermediate film 15. An example such that 2 magnetic films 16 and 17 are formed is shown in the embodied example, but a monolayer or further a multilayer of 3 or more layers may be provided. In the embodied example, $Co_{69}Cr_{21}Pt_8Ta_2$ is deposited by 3 nm so as to be a 1st magnetic film 16 and $Co_{56}Cr_{24}Pt_{12}B_8$ is further deposited by 22 nm on the 1st magnetic film 16 so as to be a 2nd magnetic film 17, that is, 2 layers of magnetic film are formed.

Moreover, an amorphous carbon (a-C) was formed by 5 nm on the 2nd magnetic film 17 by DC magnetron sputtering so as to be a protective film 18. Finally, perfluoroether (PFFPE) was applied on the protective film 15 by a substrate-lifting method so as to form a lubricating film 19 by air seasoning, so that the magnetic recording medium shown in FIG. 2 was fabricated.

Sputter conditions:
Cr: DC 300 W and Ar gas pressure 5 mTorr
$Co_{69}Cr_{21}Pt_8Ta_2$ and $Co_{56}Cr_{24}Pt_{12}B_8$: DC 200 W and Ar gas pressure 5 mTorr
a-C: DC 400 W and Ar gas pressure 5 mTorr Prior Example The structure of a magnetic recording medium in the prior art is as follows. This is a structure such that the 1st underlying film 12 (a seed film), the 2nd underlying film 13 (an organic monomolecular film) and the 1st non-magnetic intermediate film 14 (a heat resisting intermediate film) are removed from the magnetic recording medium of the embodied example shown in FIG. 2. Additionally, the fabrication process and the film deposition conditions were similar to those of the embodied example so as to perform the fabrication.

The structure of the prior magnetic recording medium is:
(1) Substrate: a glass disk (2.5 inches);
(2) Non-magnetic intermediate film 2: Cr (thickness: 5 nm);
(3) Magnetic film 1: $Co_{69}Cr_{21}Pt_8Ta_2$ (thickness: 3 nm);
(4) Magnetic film 2; $Co_{56}Cr_{24}Pt_{12}B_8$ (thickness: 22 nm);
(5) Protective film: a-C (thickness: 5 nm); and
(6) Lubricating film: PFPE (thickness: 1 nm).

FIG. 3 is a diagram that collectively shows the results of studied recording and reproducing properties of the magnetic recording medium in the embodied example and the magnetic recording medium in the prior example. The recording and reproducing conditions in these cases are as follows:

Light core width: 0.65 μm, Light electric current: 42 mA;
Lead core width: 0.4 μm, Sense electric current: 5 mA;
Head flying height: 15 nm, circumferential speed: 15 m/s; and
Linear recording density: 450 kFCI.

In the magnetic recording medium fabricated in the embodied example, medium noise decreases significantly and the signal S/N in the embodied example is 3.4 dB higher than that in the prior example. Furthermore, the overwrite property and the reproduction signal intensity are also improved. That is, according to the present invention, a magnetic recording medium capable of recording and reproducing at high recording density compared with the prior one can be confirmed.

As can be seen from the above description, a magnetic recording medium having a magnetic film in which the crystal grain diameter, the grain diameter distribution and the filling factor and further the isolation degree are all controlled can be formed, which has conventionally been difficult to achieve. Accordingly, a high-performance magnetic recording medium can be obtained, and as a result, recording and reproducing at high recording density are enabled.

Figure 4A:
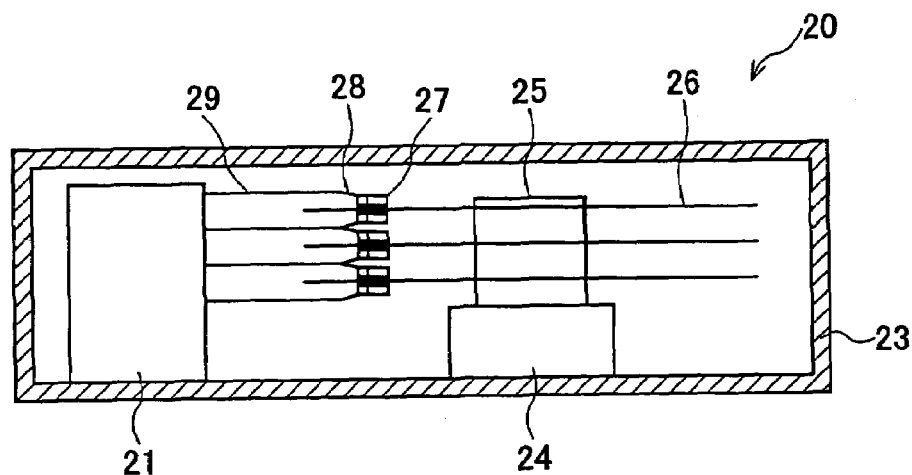
FIG. 4A is a cross-sectional view showing a substantial part of one embodied example of the magnetic recording and reproducing apparatus.

Next, one embodied example of a magnetic recording and reproducing apparatus in which the magnetic recording medium fabricated as described above is mounted is described with FIG. 4A and FIG. 4B. FIG. 4A is a cross-sectional view showing a substantial part of one embodied example of the magnetic recording and reproducing apparatus 20 and FIG. 4B is a plan view showing the substantial part of the same apparatus.

Figure 4B:
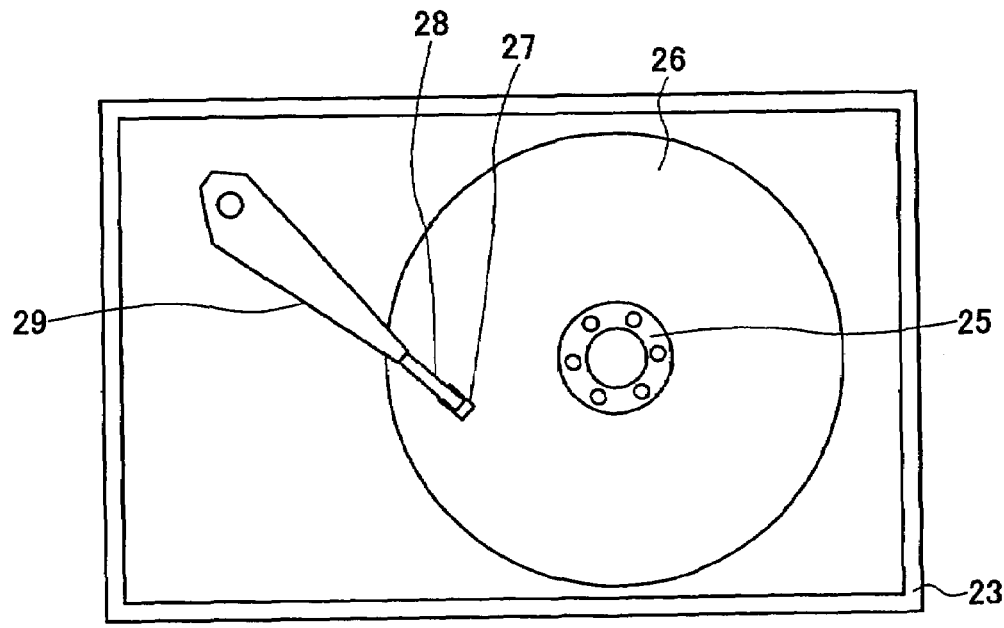
FIG. 4B is a plan view of the substantial part of the same apparatus.

As shown in FIG. 4A and FIG. 4B, the magnetic recording and reproducing apparatus generally includes a housing 23. In the housing 23, a motor 24, a hub 25, a plurality of magnetic recording media 26, a plurality of recording and reproducing heads 27, a plurality of suspensions 28, a plurality of arms 29, and an actuator unit 21 are provided. The magnetic recording media 26 are installed on the hub 25 that is rotated by the motor 24. The recording and reproducing heads 27 are composite-type recording and reproducing heads that include a reproducing head such as a MR head and a GMR head, etc., and a recording head such as an inductive head, etc. Each recording and reproducing head 27 is attached to the end of the corresponding arm 29 via the suspension 28. The arms 29 are driven by the actuator unit 21. The basic structure of the magnetic recording and reproducing apparatus itself is well known, which description is omitted in this specification.

The embodied example of the magnetic recording and reproducing apparatus 20 is characterized by the magnetic recording medium 26. Each magnetic recording medium 26 has a structure similar to that as illustrated in FIG. 2. Of course, the number of the magnetic recording media 26 is not limited to 3 and may be 1, 2, or 4 or greater.

The basic structure of the magnetic recording and reproducing apparatus 20 is not limited to that as shown in FIGS. 4A and 3B Also, the magnetic recording medium used for the present invention is not limited to a magnetic disk.

The preferred embodied example of the present invention has been described above but the present invention is not limited to such a particular embodiment and various alterations and modifications can be made within the scope of the essence of the present invention that is claimed in the claims.

What is claimed is:

1. A method of fabricating a magnetic recording medium, comprising:
   a monomolecular film formation step of forming a monomolecular film on a substrate; and
   a magnetic film formation step of forming on the monomolecular film a magnetic film for recording magnetic information,
   wherein the monomolecular film formation step is an organic monomolecular film formation step of forming an organic monomolecular film on the substrate and the organic monomolecular film is a perylene-based organic monomolecular film.

2. The method of fabricating a magnetic recording medium as claimed in claim 1, further comprising a step of forming a seed film for controlling a crystal state of the organic monomolecular film before the organic monomolecular film formation step.

3. The method of fabricating a magnetic recording medium as claimed in claim 2, wherein at least one of Ag and Au is formed on the substrate in the step of forming a seed film.

4. A method of fabricating a magnetic recording medium, comprising:
   a monomolecular film formation step of forming a monomolecular film on a substrate; and
   a magnetic film formation step of forming on the monomolecular film a magnetic film for recording magnetic information, wherein the monomolecular film formation step is an organic monomolecular film formation step of forming an organic monomolecular film on the substrate; and
   a heat-resisting intermediate film formation step of forming a heat-resisting intermediate film adsorbed selectively on the organic monomolecular film after the organic monomolecular film formation step.

5. The method of fabricating a magnetic recording medium as claimed in claim 4, wherein at least one of Ge and Si is formed on the organic monomolecular film in the heat-resisting intermediate film formation step.

6. The method of fabricating a magnetic recording medium as claimed in claim 4, further comprising a heat treatment step of performing a heat treatment after the heat-resisting intermediate film formation step.

7. The method of fabricating a magnetic recording medium as claimed in claim 6, wherein the heat treatment is performed at or above a temperature at which the organic monomolecular film evaporates.

\* \* \* \* \*